US012542340B2

(12) United States Patent
Tu et al.

(10) Patent No.: US 12,542,340 B2
(45) Date of Patent: Feb. 3, 2026

(54) 24GHz BAND-PASS FILTER

(71) Applicant: QuantumZ Inc., Kaohsiung (TW)

(72) Inventors: Kun Yen Tu, Kaohsiung (TW); Meng-Hua Tsai, Kaohsiung (TW); Wei Ting Lee, Kaohsiung (TW); Sin-Siang Wang, Kaohsiung (TW)

(73) Assignee: QuantumZ Inc., Kaohsiung (TW)

( * ) Notice: Subject to any disclaimer, the term of this patent is extended or adjusted under 35 U.S.C. 154(b) by 322 days.

(21) Appl. No.: 18/499,237

(22) Filed: Nov. 1, 2023

(65) Prior Publication Data

US 2024/0154629 A1 May 9, 2024

(30) Foreign Application Priority Data

Nov. 4, 2022 (TW) ................................ 111142230

(51) Int. Cl.
*H01P 1/203* (2006.01)

(52) U.S. Cl.
CPC .................................. *H01P 1/203* (2013.01)

(58) Field of Classification Search
CPC .. H01P 1/203; H01P 1/20327; H01P 1/20336; H01P 1/20354; H01P 1/20381; H01P 1/20363; H01P 1/2039; H01P 1/20
See application file for complete search history.

(56) References Cited

U.S. PATENT DOCUMENTS

2007/0216499 A1* 9/2007 Shih .................... H01P 1/20336 333/204
2024/0097300 A1* 3/2024 Tu .......................... H01P 1/203

* cited by examiner

*Primary Examiner* — Stephen E. Jones
(74) *Attorney, Agent, or Firm* — CKC & Partners Co., LLC

(57) ABSTRACT

A 24 GHz band-pass filter includes a step impedance resonator, a first U-shape feeding portion, a second U-shape feeding portion, short-circuit stubs and open-circuit stubs. The step impedance resonator includes a first main portion, a second main portion, and a connection portion for connecting the main portions to each other. The first main portion and the second main portion are electrically connected to a first signal input/output port and a second signal input/output port. The first U-shape feeding portion is electrically connected between the first main portion and the first signal input/output port. The second U-shape feeding portion is electrically connected between the second main portion and the second signal input/output port. The short-circuit stubs are electrically connected to coupling segments of the step impedance resonator. The open-circuit stubs are electrically connected to the first U-shape feeding portion and the second U-shape feeding portion.

15 Claims, 9 Drawing Sheets

100

100

141

24GHz BAND-PASS FILTER

RELATED APPLICATIONS

This application claims priority to Taiwan Application Serial Number 111142230, filed Nov. 4, 2022, which is herein incorporated by reference.

BACKGROUND

Field of Invention

The present invention relates to a bandpass filter, especially a bandpass filter with stepped impedance for the frequency of 24 GHz.

Description of Related Art

In recent years, electronic products such as personal computers (PCs), tablet PCs, notebook computers (NBs) or smart phones have become part of our lives in recent years. In order to provide multiple functions to meet users' demands, products integrate various electronic components with different functions. Amongst the electronic components, frequency filters are commonly used to filter out unwanted frequency bands in electronic signals. However, the passband of conventional filters is affected by a frequency multiplication effect. To avoid the frequency multiplication effect, a filter with high signal attenuation is required.

SUMMARY

Embodiments of the present invention provide a 24 GHz bandpass filter, which has higher signal attenuation at a stopband, such that signals of the filter are prevented from being affected by frequency multiplication, and thus signals outside a passband are prevented from being amplified by back-end components (for example, amplifiers). The 24 GHz bandpass filter of the embodiments of the present invention adopts a stepped impedance resonator, and thus the multiplied frequencies of the passband can be shifted to higher frequencies by using the stepped impedance characteristic, thereby preventing the passband of the 24 GHz bandpass filter from being affected by the frequency multiplication effect.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to a particular order or sequence.

Figure 1:
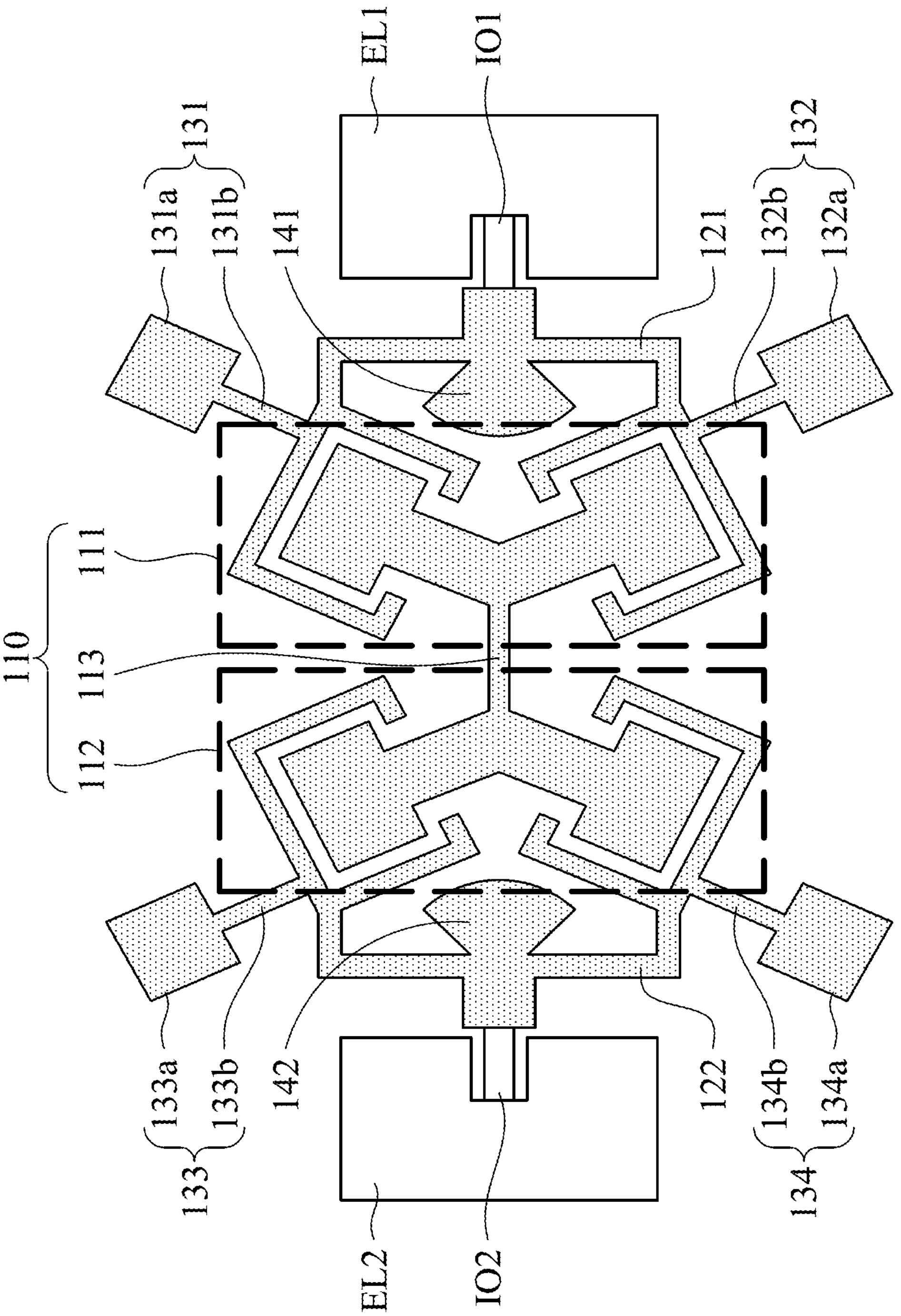
FIG. 1 is a schematic diagram showing a structure of a 24 GHz bandpass filter in accordance with an embodiment of the present invention.
Figure 2:
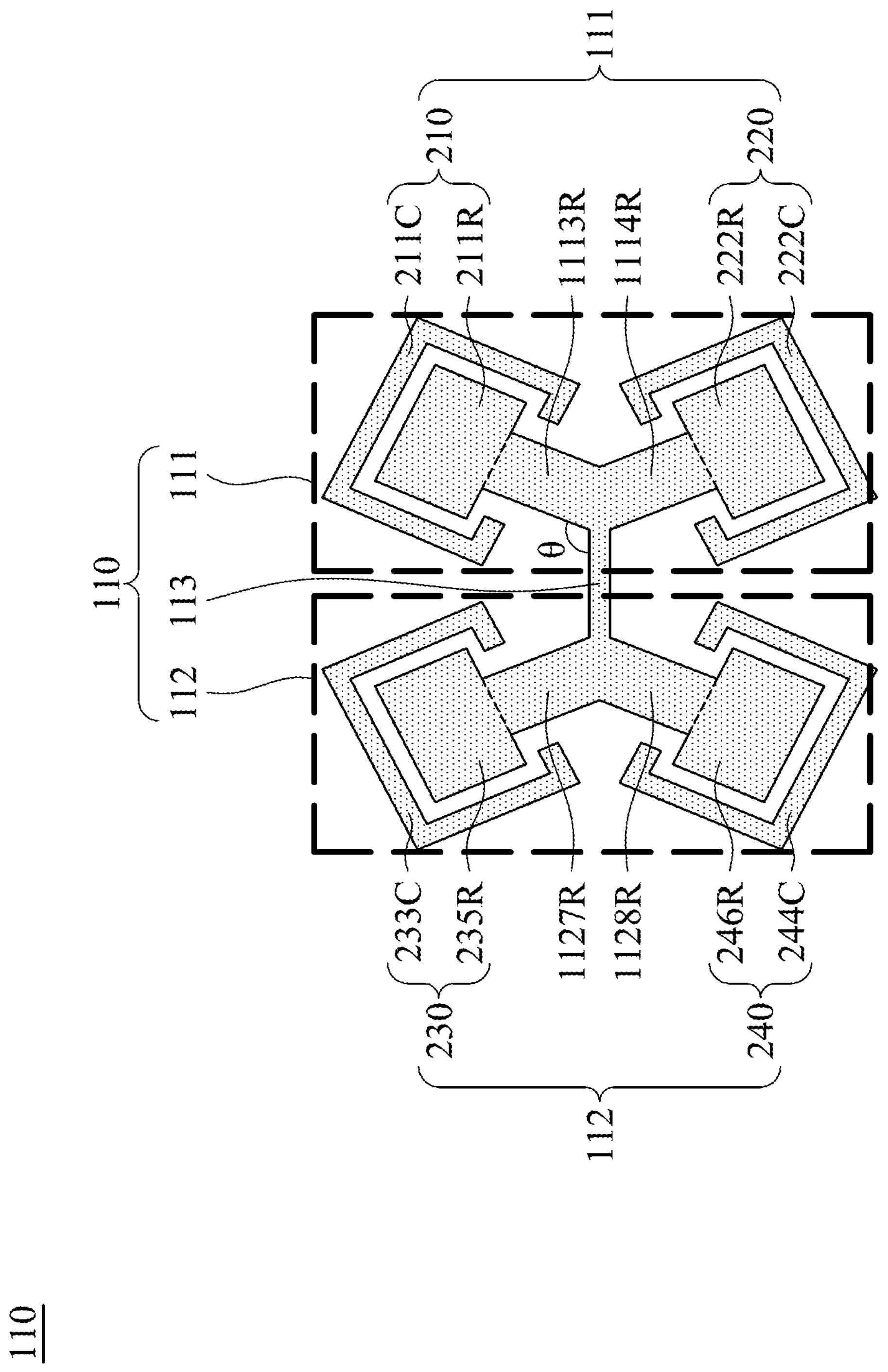
FIG. 2 is a schematic diagram showing a structure of an impedance resonator of the 24 GHz bandpass filter 100 in accordance with an embodiment of the present invention.

Referring FIG. 1 and FIG. 2, FIG. 1 is a schematic diagram showing a structure of a 24 GHz bandpass filter 100 in accordance with an embodiment of the present invention, and FIG. 2 is a schematic diagram showing a structure of an impedance resonator of the 24 GHz bandpass filter 100. As shown in FIG. 1, the 24 GHz bandpass filter 100 includes the step impedance resonator 110, a first U-shaped feeding portion 121, a second U-shaped feeding portion 122, a plurality of short-circuit stubs 131-134 (also referred to as a first short-circuit stub 131, a second short-circuit stub 132, a third short-circuit stub 133 and a fourth short-circuit stub 134) and a plurality of open-circuit stubs 141-142 (also referred to as a first open-circuit stub 141 and a second open-circuit stub 142). The first U-shaped feeding portion 121 is disposed between the stepped impedance resonator 110 and the first signal input/output port IO1 for receiving/outputting signals. Similarly, the second U-shaped feeding portion 122 is disposed between the stepped impedance resonator 110 and the second signal input/output port IO2 for receiving/outputting signals.

For the convenience of explaining embodiments of the present invention, the signal to be filtered is inputted from the first signal input/output port IO1 to the first U-shaped feeding portion 121, and a filtered signal is output from the second U-shaped feeding portion 122. The filtered signal is then sent to the second signal output port IO2, so as to provide the filtered signal to other external devices through the second signal output port IO2. However, embodiments of the present invention are not limited thereto. In other embodiments of the present invention, the signal to be filtered can be inputted to the second U-shaped feeding portion 122 from the second signal input/output port IO2, and the filtered signal is outputted from the first U-shaped feeding portion 121 to the first signal input/output port IO1, so as to provide the filtered signal to other external devices through the first signal output/output port IO1. In some embodiments, electrodes EL1 and EL2 may be disposed corresponding to the first signal input/output port IO1 and the second signal input/output port IO2.

The stepped impedance resonator 110 includes a first main portion 111, a second main portion 112 and a connection portion 113 disposed and electrically connected therebetween. The first main portion 111 and the second main portion 112 are symmetric with respect to a center of the connection portion 113. As shown in FIG. 2, the first main portion 111 includes: a first signal coupling portion 210 having a first impedance portion 211R and a first coupling line segment 211C, a second signal coupling portion 220 having a second impedance portion 222R and a second coupling line segment 222C, a third impedance portion 1113R and a fourth impedance portion 1114R. Similarly, the second main portion 112 includes: a third signal coupling portion 230 having a fifth impedance portion 235R and a third coupling line segment 233C, a fourth signal coupling portion 240 having a sixth impedance portion 246R and a fourth coupling line segment 244C, a seventh impedance portion 1127R and an eighth impedance portion 1128R. In this embodiment, the stepped impedance resonator 110 has a resonance length equal to a quarter wavelength, but the embodiments of the present invention are not limited thereto.

In the first signal coupling portion 210, the first coupling line segment 211C is disposed surrounding the first impedance portion 211R. In this embodiment, the first impedance portion 211R is rectangular, and the first coupling line segment 211C is disposed along four sides of the first impedance portion 211R. In the second signal coupling portion 220, the second coupling line segment 222C is disposed around the second impedance portion 222R. In this embodiment, the second impedance portion 222R is rectangular, and the second coupled line segment 222C is disposed along four sides of the second impedance portion 222R.

The first coupling line segment 211C and the second coupling line segment 222C are electrically connected to the first U-shaped feeding portion 121 (as shown in FIG. 1) to receive a signal transmitted by the first U-shaped feeding portion 121, and to transmit this signal to the stepped impedance resonator 110 by using signal coupling. The third impedance portion 1113R and the fourth impedance portion 1114R are respectively electrically connected to the first impedance portion 211R and the second impedance portion 222R, and a connection portion between the third impedance portion 1113R and the fourth impedance portion 1114R is electrically connected to the connection portion 113 mentioned above.

In the third signal coupling portion 230, the third coupling line segment 233C is disposed surrounding the fifth impedance portion 235R. In this embodiment, the fifth impedance portion 235R is rectangular, and the third coupling line segment 233C is disposed along four sides of the fifth impedance portion 235R. In the fourth signal coupling portion 240, the fourth coupling line segment 244C is disposed surrounding the sixth impedance portion 246R. In this embodiment, the sixth impedance portion 246R is rectangular, and the fourth coupling line segment 244C is disposed along four sides of the sixth impedance portion 246R.

The third coupling line segment 233C and the fourth coupling line segment 244C are electrically connected to the second U-shaped feeding portion 122 (as shown in FIG. 1), so as to transmit the signal from the stepped impedance resonator 110 to the second U-shaped feeding portion 122 by using signal coupling. The seventh impedance portion 1127R and the eighth impedance portion 1128R are respectively electrically connected to the fifth impedance portion 235R and the sixth impedance portion 246R, and a connection portion between the seventh impedance portion 1127R and the eighth impedance portion 1128R is electrically connected with the connection portion 113 mentioned above.

In some embodiments, an included angle θ between the connecting portion 113 and each of the third impedance portion 1113R, the fourth impedance portion 1114R, the seventh impedance portion 1127R and the impedance of the eighth impedance portion 1128R is greater than 90 degrees. In some embodiments, the first impedance portion 211R, the second impedance portion 222R, the fifth impedance portion 235R and the sixth impedance portion 246R have impedance values the same as each other; the third impedance portion 1113R, the fourth impedance portion 1114R, the seventh impedance portion 1127R and the eighth impedance portion 1128R have impedance values the same as each other.

Figure 3A:
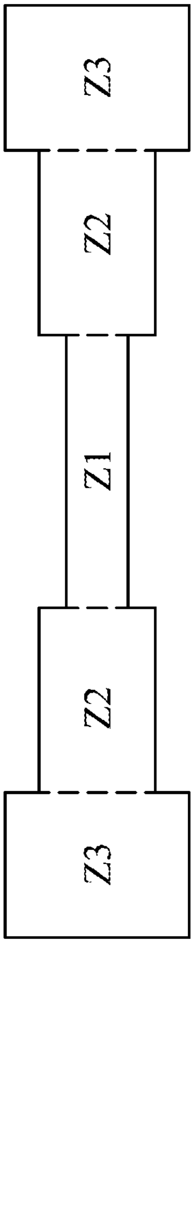
FIG. 3A and FIG. 3B are diagrams illustrating an impedance design of the stepped impedance resonator in accordance with embodiments of the present invention.
Figure 3B:
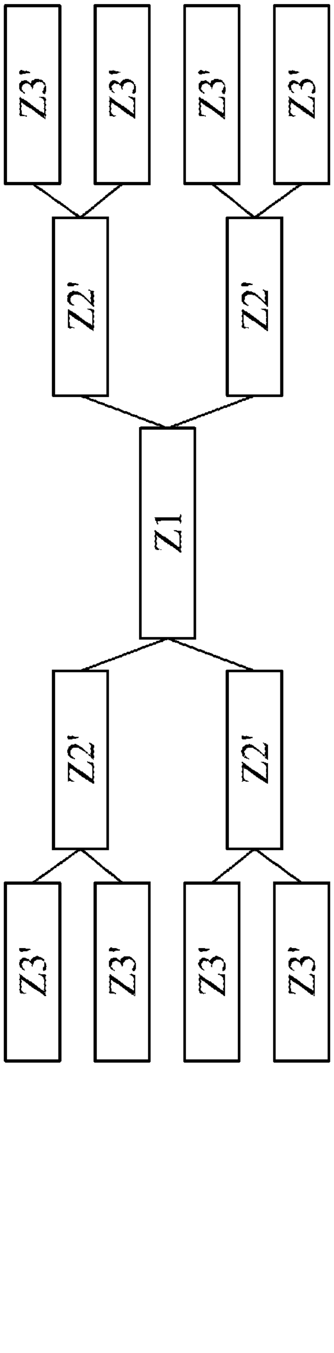

Referring to FIG. 3A and FIG. 3B simultaneously, FIG. 3A and FIG. 3B are diagrams illustrating an impedance design of the stepped impedance resonator 110 in accordance with embodiments of the present invention. As shown in FIG. 3B, the impedance of the stepped impedance resonator 110 of this embodiment of the present invention is designed to have a gradually decreased impedance value as the stepped impedance resonator 110 extends from a center position (e.g., a center of a impedance portion Z1) to side positions (e.g., sides of impedance portions Z3). This impedance design may control the multiplied frequencies of the passband to be away from the frequencies of the passband.

However, a larger line width is required for the impedance portions having lower impedance values (for example the impedance portions Z2 and Z3), and the design of the larger line width may occupy larger space and become difficult for layout. In order to achieve the impedance design shown in FIG. 3A, the stepped impedance resonator 110 of this embodiment of the present invention replaces the lower impedance portion with higher impedance portions connected in parallel, so that the space occupied by the stepped impedance resonator 110 can be reduced, and interference of parasitic capacitance is also reduced.

Specifically, as shown in FIG. 3A, an impedance value of the impedance portion Z1 is greater than an impedance value of the impedance portion Z2, and the impedance value of the impedance portion Z2 is greater than the impedance value of the impedance portion Z3. The impedance portions Z1, Z2 and Z3 are arranged to show that the impedance portion Z1 is disposed the center of the whole structure and the impedance portions Z2 and Z3 are sequentially disposed outwards from the center of the whole structure. As shown in FIG. 3B, in order to reduce the space occupied by the stepped impedance resonator 110, the impedance portion Z2 is replaced by parallelly connected high impedance portions Z2', and the impedance portion Z3 is replaced by parallelly connected high impedance portions Z3', in which an impedance value of the high impedance portion Z2' is greater than the impedance value of the impedance portion Z2, and an impedance value of the high impedance portion Z3' is greater than the impedance value of the impedance portion Z3.

The first U-shaped feeding portion 121 and the second U-shaped feeding portion 122 adopted by the 24 GHz bandpass filter 100 of the embodiments of the present invention can increase a coupling length of signals to avoid the influence of insufficient signal coupling, thereby improving the bandwidth of the 24 GHz bandpass filter 100.

Returning to FIG. 1, the short-circuit stubs 131-134 are electrically connected to the coupling line segments of the stepped impedance resonator 110 in a one-to-one manner to increase the bandwidth of the passband. The short-circuit stubs 131-134 are symmetrically disposed on the stepped impedance resonator 110, and each of the short-circuit stubs 131-134 includes a wider portion and a narrower portion. For example, the short-circuit stub 131 includes a wider portion 131*a* and a narrower portion 131*b*. For another example, the short-circuit stub 132 includes a wider portion 132*a* and a narrower portion 132*b*. For further another example, the short-circuit stub 133 includes a wider portion 133*a* and a narrower portion 133*b*. For still another example, the short-circuit stub 134 includes a wider portion 134*a* and a narrower portion 134*b*. In this embodiment, each of the short-circuit stubs 131-134 has a length equal to a quarter wavelength, but the embodiments of the present invention are not limited thereto. In addition, in the embodiments of the present invention, the short-circuit stubs 131-134 are electrically grounded.

Figure 4A:
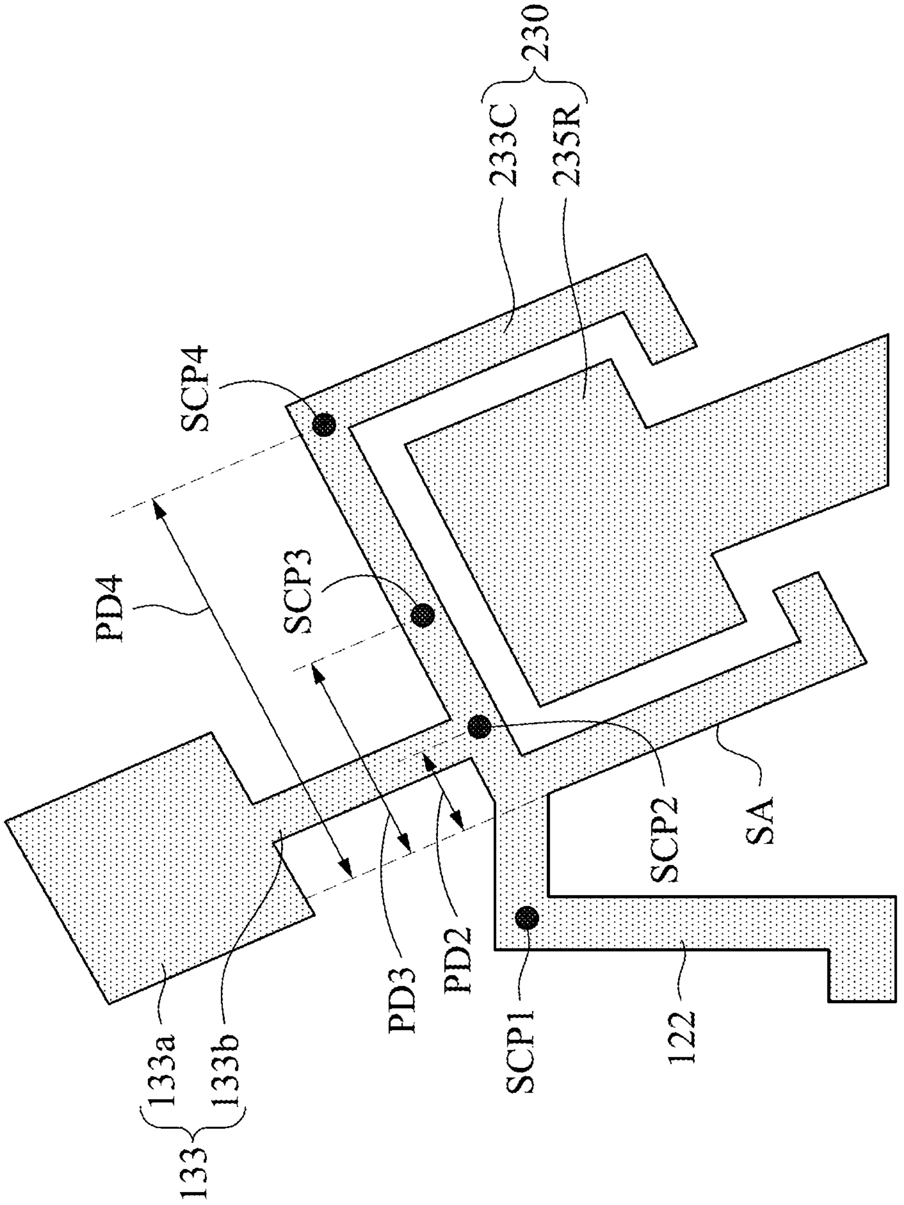
FIG. 4A to FIG. 4D are schematic diagrams showing the short-circuit stubs and corresponding connection points in accordance with an embodiment of the present invention.
Figure 4B:
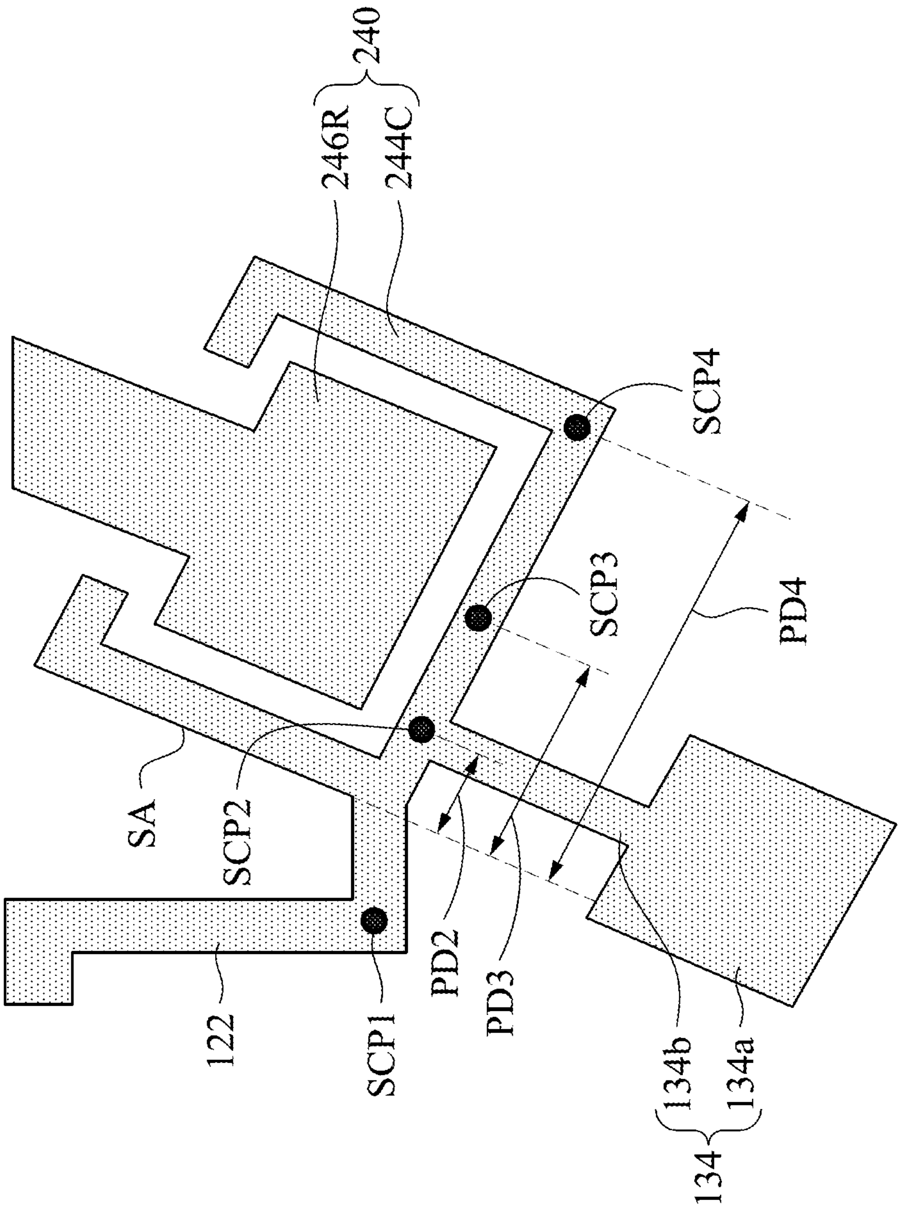
Figure 4C:
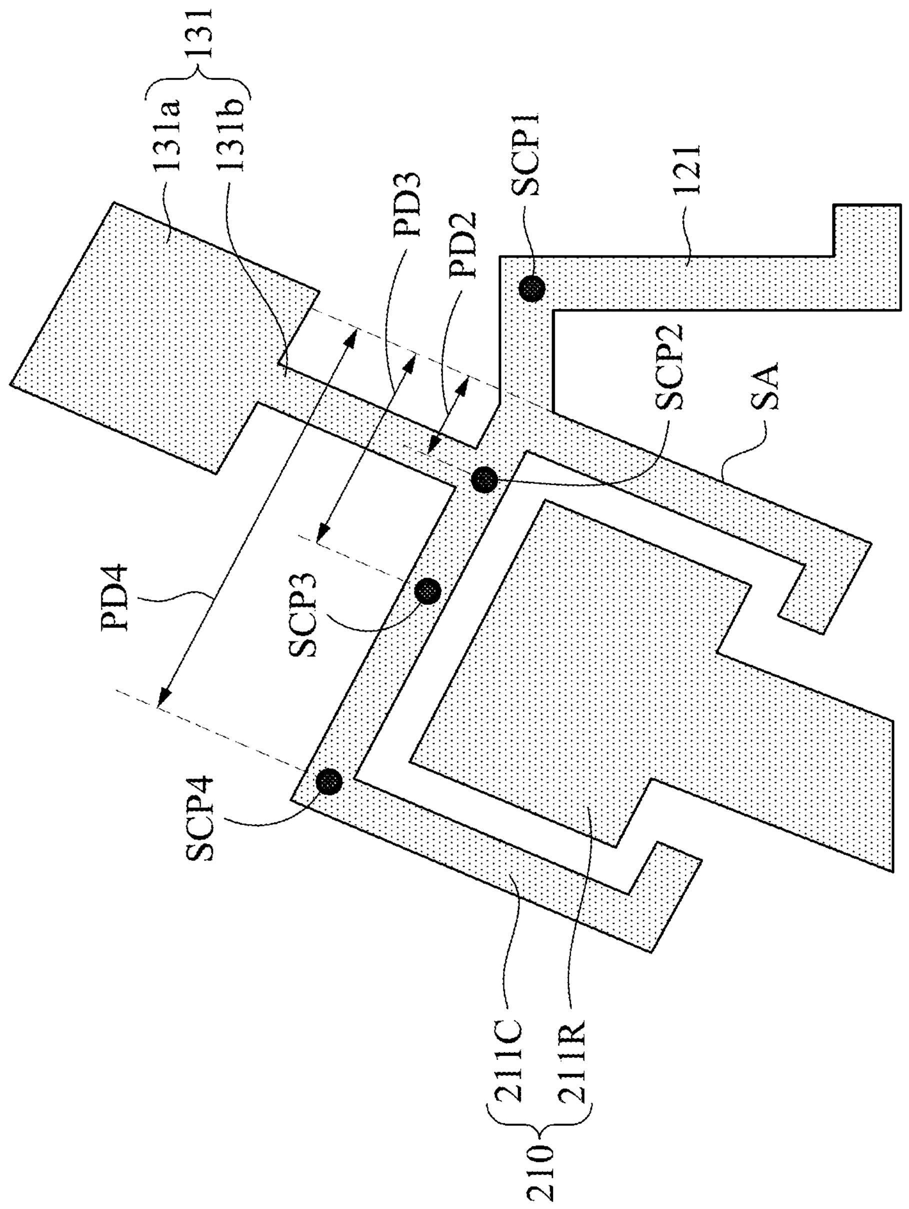
Figure 4D:
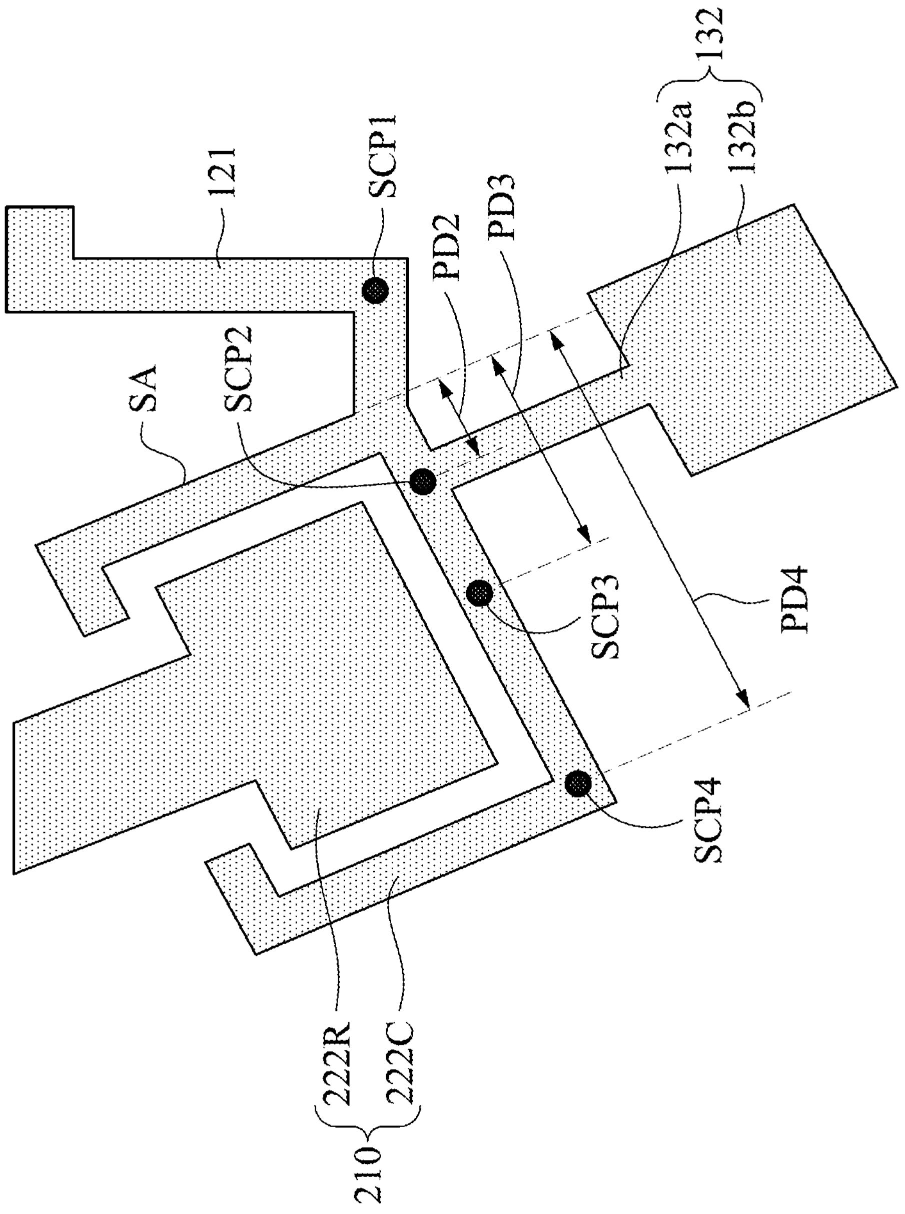

Referring to FIG. 4A to FIG. 4D simultaneously, FIG. 4A to FIG. 4D are schematic diagrams showing the short-circuit stubs 131-134 and corresponding connection points SCP1-SCP4 in accordance with an embodiment of the present invention. In this embodiment of the present invention, the connection points of the short-circuit stubs 131-134 are related to a center frequency of the passband of the 24 GHz bandpass filter 100. For convenience of explaining this embodiment, the short circuit stub 133 (as shown in FIG. 4A) will be used as an example in the following descriptions.

As shown in FIG. 4A, the short-circuit stub 133 can be electrically connected to one of the connection points SCP1-SCP4 to enable the 24 GHz bandpass filter 100 to provide a passband center frequency corresponding to the one of the connection points SCP1-SCP4, in which the connection point SCP1 is located at the second U-shaped feeding portion 122, the connection point SCP4 is located at the corner of the third coupled line segment 233C away from the second U-shaped feeding portion 122, and the connection points SCP2 and SCP3 are located between the connection points SCP1 and SCP4. In the embodiments of the present invention, the connection point(s) near the second U-shaped feeding portion 122 corresponds to a lower passband center frequency, and the connection point(s) far away from the second U-shaped feeding portion 122 corresponds to a higher passband center frequency.

For example, when the short-circuit stub 133 is electrically connected to the connection point SCP1, the 24 GHz band-pass filter 100 has a passband center frequency f1; when the short-circuit stub 133 is electrically connected to the connection point SCP2, the 24 GHz band-pass filter 100 has a passband center frequency f2; when the short-circuit stub 133 is electrically connected to the connection point SCP3, the 24 GHz bandpass filter 100 has a passband center frequency f3; when the short-circuit stub 133 is electrically connected to the connection point SCP4, the 24 GHz band-pass filter has a passband center frequency f4, where f1<f2<f3<f4.

The above embodiments illustrate the influence of the short-circuit stub 133 in connection with the corresponding connection points SCP1-SCP4 on the frequencies of the 24 GHz band-pass filter 100. In the embodiments of the present invention, all the short-circuit stubs are connected to the same connection points to provide the center frequency of the passband required by the user. For example, in this embodiment, as shown in FIG. 4A to FIG. 4D, in order to provide a passband center frequency of 20.52 GHz, the short-circuit stubs 131-134 are all connected to the connection points SCP1. For example, in another embodiment, in order to provide a passband center frequency of 23.96 GHz, the short-circuit stubs 131-134 are all connected to the connection points SCP2. For example, in further another embodiment, in order to provide a passband center frequency of 24.70 GHz, the short-circuit stubs 131-134 are all connected to the connection point SCP3. For example, in still another embodiment, in order to provide a passband center frequency of 25.27 GHz, the short stubs 131-134 are all connected to the connection points SCP4. In one embodiment, a distance PD2 between the connection point SCP2 and the side SA of the third coupling line segment 233C is 0.1 mm; a distance PD3 between the connection point SCP3 and the side SA of the third coupling line segment 233C is 0.36 mm; a distance PD4 between the connection point SCP4 and the side SA of the third coupled line segment 233C is 0.72 mm.

In addition, in some embodiments, the short-circuit stubs 131-134 can be electrically connected to any one of the connection points SCP1-SCP4 to provide the passband center frequency to meet user's demands.

Figure 5:
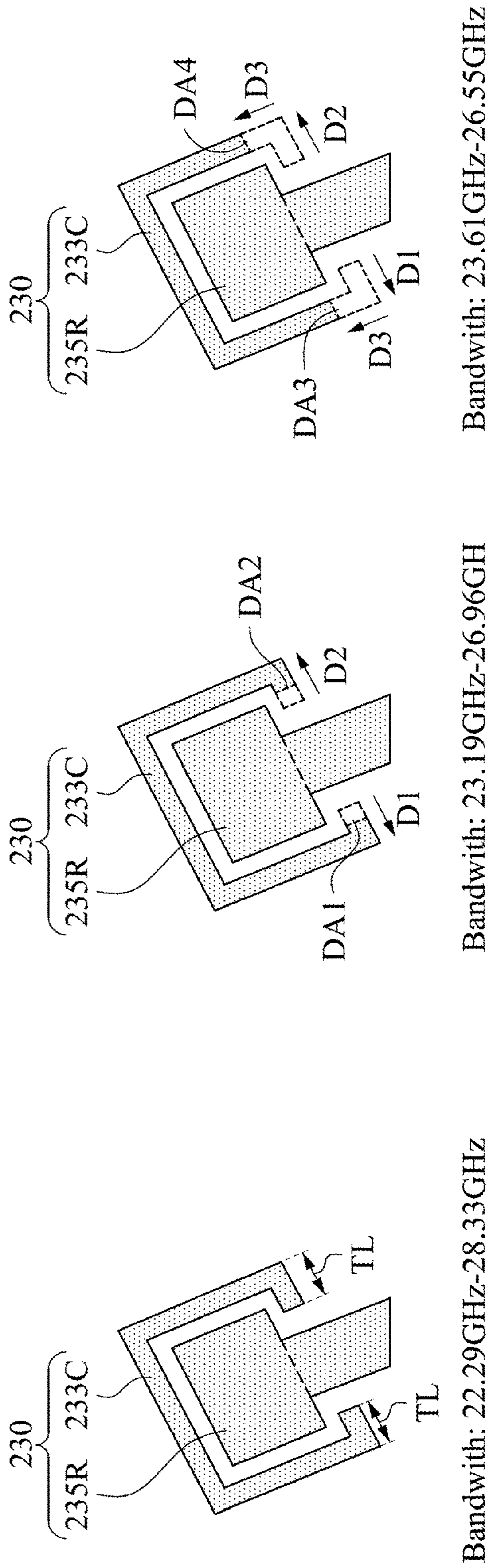
FIG. 5 is a schematic diagram illustrating different length reductions of the coupling line segments of the signal coupling portion in accordance with embodiments of the present invention.

Referring to FIG. 5, FIG. 5 is a schematic diagram illustrating different length reductions of the coupling line segments of the signal coupling portion in accordance with embodiments of the present invention. In the embodiment of the present invention, an extension length of the coupling line segment in each of the first signal coupling segment 210, the second signal coupling segment 220, the third signal coupling segment 230 and the fourth signal coupling segment 240 is related to the center frequency of the passband of the 24 GHz bandpass filter 100. In the embodiments of the present invention, the extension lengths of all coupling line segments have the same length reduction to provide the passband center frequency required by the user. For the convenience of explaining the length reductions of the coupling line segments, the third coupling line segment 233C of the third signal coupling portion 230 will be used as an example in the following descriptions.

As shown in FIG. 5, when the third coupling line segment 233C is disposed corresponding to the four sides of the rectangular fifth impedance portion 235R and surrounding the four sides of the rectangular fifth impedance portion 235R, the 24 GHz bandpass filter 100 is capable of providing a bandwidth from 22.29 GHz to 28.33 GHz correspondingly, in which the third coupling line segment 233C has two terminal portions TL which are not closed. In this embodiment, a length of the terminal portion TL is 0.17 mm, but the embodiments of the present invention are not limited thereto. When a length of the third coupling line segment 233C is reduced, and the third coupling line segment 233C has length reductions DA1 and DA2 in directions D1 and D2, the 24 GHz bandpass filter 100 is capable of providing a bandwidth from 23.19 GHz to 26.96 GHz correspondingly, in which the length reductions DA1 and DA2 are the same as each other. For example, the length reductions DA1 and DA2 are 0.1 mm. When the length of the third coupling line segment 233C further reduced, and the third coupling line segment 233C has length reductions DA3 and DA4 in directions D3 and D4, the 24 GHz bandpass filter 100 is capable of providing a bandwidth from 23.61 GHz to 26.55 GHz correspondingly, in which the length reductions DA3 and DA4 are the same as each other. For example, the length reductions DA3 and DA4 are 0.2 mm.

Figure 6:
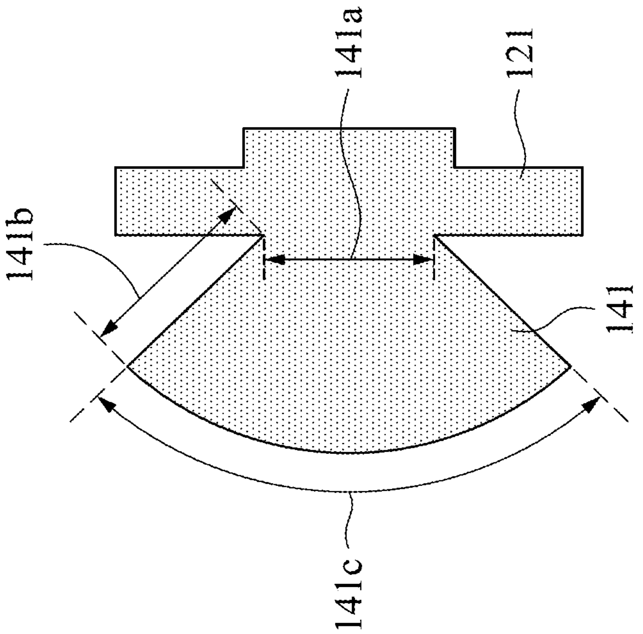
FIG. 6 is a schematic diagram illustrating an open-circuit stub in accordance with embodiments of the present invention.

Referring to FIG. 6, FIG. 6 is a schematic diagram illustrating an open-circuit stub in accordance with embodiments of the present invention. In the embodiments of the present invention, the open-circuit stubs 141 and 142 are used to suppress high-frequency stopband (triple frequency)/noise, in which the open-circuit stubs 141 and 142 are designed to have fan-shaped structures. Therefore, it is convenient for the user to adjust the parameters of the open-circuit stubs 141 and 142 (for example radius) in accordance with user's demands. In some embodiments, the open-circuit stubs 141 and 142 may be designed in another shape, such as a circular shape, a triangular shape, and a rectangular shape. In addition, the open-circuit stubs 141 and 142 are symmetrically disposed with respect to a center of the connection portion 113. Since the structures of the open-circuit stubs 141 and 142 are similar to each other, the open-circuit stub 141 will be used as an example to explain this embodiment in the following descriptions for convenience.

As shown in FIG. 6, the open-circuit stub 141 is in the fan-shaped structure. The fan-shaped structure has a first terminal close to the first signal input/output port IO1 and a second terminal far away from the first signal input/output port IO1. An area of the fan-shaped structure is gradually increased from the first terminal to the second terminal. The open-circuit stub 141 has a width 141*a* of a narrowest portion, a radius length 141*b* and an arc length 141*c*. In this embodiment, the width 141*a* of the narrowest portion, the radius length 141*b* and/or the arc length 141*c* can be designed to tune the performance of the open-circuit stub 141 with respect to the suppression on high-frequency stopband (triple frequency)/noise to meet the user's demands. For example, the width 141*a* of the narrowest portion can be designed to be 0.18 mm. For another example, the radius length 141*b* can be designed to be 0.252 mm. However, the embodiments of the present invention are not limited thereto.

Referring FIG. 1 and FIG. 6 simultaneously, the open-circuit stubs are located at the centers of the U-shaped feeding portions, respectively. For example, the open-circuit stub 141 is located at the center of the first U-shaped feeding portion 121. For another example, the open-circuit stub 142 is located at the center of the second U-shaped feeding portion 122. Since the first U-shaped feeding portion 121 and the second U-shaped feeding portion 122 are disposed corresponding to the position of the connection poriton 113, and the position of the connection poriton 113 corresponds to the connection portion between the third impedance portion 1113R and the fourth impedance portion 1114R and to the connection portion between the seventh impedance portion 1127R and the eighth impedance portion 1128R (as shown in FIG. 2), the open-circuit stubs 141 and 142 can be considered to be disposed in an included-angle region defined by the third impedance portion 1113R and the fourth impedance portion 1114R and in an included-angle region defined by the seventh impedance portion 1127R and the eighth impedance portion 1128R.

In the embodiments of the present invention, the open-circuit stubs 141 and 142 in the fan shape are capable of greatly improving the suppression effect on the stopband noise. For example, for the stopband from 32 GHz to 46 GHz, the noise can be suppressed to be less than −20 dB; for the stopband from 46 GHz to 60 GHz, the noise can be suppressed to be less than −30 dB; for the stopband from 60 GHz to 90 GHz, the noise can be suppressed to be less than −40 dB; for the frequency band near the triple frequency 97 GHz, the noise can be suppressed to be less than −20 dB.

In addition, in some embodiments of the present invention, the 24 GHz bandpass filter can be disposed on a flexible substrate to allow the 24 GHz bandpass filter to be bendable. The flexible substrate can be, for example, a substrate made of Liquid Crystal Polymer (LCP). In some embodiments, the 24 GHz bandpass filter can be directly designed and formed in the printed circuit board in a single process. It is not necessary to fabricate plural components (portions) of the 24 GHz bandpass filter by performing plural additional processes.

In some embodiments, an LCP protection layer can be formed on the printed circuit board to cover and protect the 24 GHz bandpass filter.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A 24 GHz band-pass filter, comprising:
a step impedance resonator comprising:
a first main portion electrically connected to a first signal input/output port, wherein the first main portion comprises:
a first signal coupling portion comprising a first impedance portion and a first coupling line segment surrounding the first impedance portion;
a second signal coupling portion comprising a second impedance portion and a second coupling line segment surrounding the second impedance portion;
a third impedance portion electrically connected to the first impedance portion, wherein an impedance value of the third impedance portion is greater than an impedance value of the first impedance portion; and
a fourth impedance portion electrically connected to the second impedance portion, wherein an impedance value of the fourth impedance portion is greater than an impedance value of the second impedance portion;
a second main portion electrically connected to a second signal input/output port, wherein the second main portion comprises:
a third signal coupling portion comprising a fifth impedance portion and a third coupling line segment surrounding the fifth impedance portion;
a fourth signal coupling portion comprising a sixth impedance portion and a fourth coupling line segment surrounding the sixth impedance portion;
a seventh impedance portion electrically connected to the fifth impedance portion, wherein an impedance value of the seventh impedance portion is greater than an impedance value of the fifth impedance portion; and
an eighth impedance portion electrically connected to the sixth impedance portion, wherein an impedance value of the eighth impedance portion is greater than an impedance value of the sixth impedance portion; and
a connection portion disposed between the first main portion and the second main portion to electrically connect the first main portion with the second main portion, wherein one terminal of the connection portion is electrically connected to the third impedance portion and the fourth impedance portion, the other terminal of the connection portion is electrically connected to the seventh impedance portion and the eighth impedance portion, an impedance value of the connection portion is greater than an impedance value of the third impedance portion, an impedance value of the fourth impedance portion, an impedance value of the seventh impedance portion an impedance portion and an impedance value of the eighth impedance portion;

a first U-shaped feeding portion electrically connected between the first main portion and the first signal input/output port;

a second U-shaped feeding portion electrically connected between the second main portion and the second signal input/output port;

a plurality of short-circuit stubs electrically connected to the first coupling line segment, the second coupling line segment, the third coupling line segment, and the fourth coupling line segment in a one-to-one manner; and a plurality of open-circuit stubs electrically connected to the first U-shaped feeding portion and the second U-shaped feeding portion in a one-to-one manner.

2. The 24 GHz band-pass filter of claim 1, wherein:

the first U-shaped feeding portion has a first feeding line segment and a second feeding line segment, the first feeding line segment is electrically connected to the first coupling line segment, and the second feeding line segment is electrically connected to the second coupling line segment;

the second U-shaped feeding portion has a third feeding line segment and a fourth feeding line segment, the third feeding line segment is electrically connected to the third coupling line segment, and the fourth feeding line segment is electrically connected to the fourth coupling line segment.

3. The 24 GHz band-pass filter of claim 1, wherein:

the first coupling line segment extends along a side of the first impedance portion and has a first extension length;

the second coupling line segment extends along a side of the second impedance portion and has a second extension length;

the third coupling line segment extends along a side of the third impedance portion and has a third extension length;

the fourth coupling line segment extends along a side of the fourth impedance portion and has a fourth extension length;

wherein the first extension length, the second extension length, the third extension length and the fourth extension length are determined in accordance with a predetermined frequency band of the band-pass filter.

4. The 24 GHz band-pass filter of claim 1, wherein an included angle between the connection portion and each of the third impedance portion, the fourth impedance portion, the seventh impedance portion and the eighth impedance portion is greater than 90 degrees.

5. The 24 GHz band-pass filter of claim 4, wherein:

the open stubs comprise a first open stub and a second open stub;

the third impedance portion and the fourth impedance portion define a first included-angle region, and the first open stub is disposed in the first included-angle region;

the fifth impedance portion and the fourth impedance portion define a second included-angle region, and the second open stub is disposed in the second included-angle region.

6. The 24 GHz band-pass filter of claim 1, wherein the open-circuit stubs are fan-shaped stubs.

7. The 24 GHz band-pass filter of claim 1, wherein the short-circuit stubs comprises:

a first short-circuit stub electrically connected to the first coupling line, wherein the first short-circuit stub is electrically connected to a first connection position of the first coupling line, and the first connection position is determined in accordance with a predetermined frequency band of the band-pass filter;

a second short-circuit stub electrically connected to the second coupling line, wherein the second short-circuit stub is electrically connected to a second connection position of the second coupling line, and the second connection position is determined in accordance with the predetermined frequency band of the band-pass filter;

a third short-circuit stub electrically connected to the third coupling line segment, wherein the third short-circuit stub is electrically connected to a third connection position of the third coupling line, and the third connection position is determined in accordance with the predetermined frequency band of the band-pass filter; and a fourth short-circuit stub electrically connected to the fourth coupled line segment, wherein the fourth short-circuit stub is electrically connected to a fourth connection position of the fourth coupling line, and the fourth connection position is determined in accordance with the predetermined frequency band of the band-pass filter.

8. The 24 GHz band-pass filter of claim 1, wherein the impedance values of the first impedance portion, the second impedance portion, the fifth impedance portion and the sixth impedance portion are the same as each other, and the impedance values of the third impedance portion, the fourth impedance portion, the seventh impedance portion and the eighth impedance portion are the same as each other.

9. The 24 GHz band-pass filter of claim 1, wherein a length of each of the short-circuit stubs is a quarter wavelength.

10. A 24 GHz band-pass filter, comprising:

a step impedance resonator comprising:

a first main portion electrically connected to a first signal input/output port;

a second main portion electrically connected to a second signal input/output port; and a connection portion disposed between the first main portion and the second main portion to electrically connect the first main portion with the second main portion, wherein an impedance value of the connection portion is smaller than an impedance value of the first main portion and an impedance value of the second main portion;

a first U-shaped feeding portion electrically connected between the first main portion and the first signal input/output port;

a second U-shaped feeding portion electrically connected between the second main portion and the second signal input/output port;

a first short-circuit stub electrically connected to a first coupling portion of the first main portion;

a second short-circuit stub electrically connected to a second coupling portion of the first main portion;

a third short-circuit stub electrically connected to a third coupling portion of the second main portion;

a fourth short-circuit stub electrically connected to a fourth coupling portion of the second main portion;

a first open-circuit stub electrically connected to the first U-shaped feeding portion, and located in an area defined by the first main portion and the first U-shaped feeding portion; and a second open-circuit stub is electrically connected to the second U-shaped feeding portion and located in an area defined by the second main portion and the second U-shaped feeding portion.

11. The 24 GHz band-pass filter of claim 10, wherein an included angle between the connection portion and an impedance portion of the first main portion of the step impedance resonator is greater than 90 degrees, and another included angle between the connection portion and an impedance portion of the second main portion of the step impedance resonator is greater than 90 degrees.

12. The 24 GHz band-pass filter of claim 10, wherein the first open-circuit stub and the second open-circuit stub are fan-shaped stubs.

13. The 24 GHz band-pass filter of claim 10, wherein:

the first open-circuit stub has a first terminal and a second terminal, the first terminal is near the first signal input/output port, and the second terminal is far away from the first signal input/output port, and an area of the first open-circuit stub is gradually increased from the first terminal to the second terminal;

the second open-circuit stub has a third terminal and a fourth terminal, the third terminal is near the second signal input/output port, and the fourth terminal is far away from the second signal input/output port, and an area of the second open-circuit stub is gradually increased from the third terminal to the fourth terminal.

14. The 24 GHz band-pass filter of claim 10, wherein the first main portion and the second main portion are symmetric with respect to a center of the connection portion.

15. The 24 GHz band-pass filter of claim 10, wherein a length of each of the first short-circuit stub, the second short-circuit stub, the third short-circuit stub and the fourth short-circuit stub is a quarter wavelength.

* * * * *